United States Patent
Straayer et al.

[19]

[11] Patent Number: 5,818,508
[45] Date of Patent: Oct. 6, 1998

[54] IMAGING DEVICE AND MEDIA HANDLING APPARATUS

[75] Inventors: Ronald J. Straayer, South Windsor; David P. Squires, Lebanon; David D. Williams, Enfield; Christopher J. Chestnut, East Windsor; Timothy P. MacDonald, South Windsor; John E. Markowski, III, Berlin, all of Conn.

[73] Assignee: Gerber Systems Corporation, South Windsor, Conn.

[21] Appl. No.: 539,964

[22] Filed: Oct. 6, 1995

[51] Int. Cl.$^6$ ........................................... B41J 2/47
[52] U.S. Cl. .................................. 347/262; 271/97
[58] Field of Search .................... 347/262, 264, 347/153; 271/11, 18, 20, 90, 97, 98; 346/134, 136, 138

[56] References Cited

U.S. PATENT DOCUMENTS

| | | |
|---|---|---|
| 571,601 | 11/1896 | McKee . |
| 1,382,951 | 6/1921 | Breen . |
| 3,036,304 | 5/1962 | Willard . |
| 3,100,110 | 8/1963 | Winkler . |
| 3,403,903 | 10/1968 | Crail . |
| 3,635,464 | 1/1972 | Gramlich . |
| 3,938,800 | 2/1976 | Wirz ............................................ 271/93 |
| 4,027,872 | 6/1977 | Bueker ....................................... 271/70 |
| 4,275,877 | 6/1981 | Silverberg ................................. 271/66 |
| 4,347,785 | 9/1982 | Chase et al. ................................ 101/1 |
| 4,708,333 | 11/1987 | Servi et al. ................................ 270/45 |
| 4,958,824 | 9/1990 | Willis et al. ............................... 271/11 |
| 5,048,811 | 9/1991 | Hochbein .................................... 271/5 |
| 5,092,578 | 3/1992 | Bergmeir et al. .......................... 271/97 |
| 5,100,121 | 3/1992 | Taikei et al. ................................ 271/4 |
| 5,137,268 | 8/1992 | Suya et al. ................................. 271/20 |
| 5,171,007 | 12/1992 | Kaspraz et al. ............................. 271/4 |
| 5,181,709 | 1/1993 | Okada et al. .............................. 271/97 |
| 5,184,153 | 2/1993 | Daniell et al. ........................... 346/108 |
| 5,184,812 | 2/1993 | Wamba .................................... 271/98 |
| 5,191,353 | 3/1993 | Corona ..................................... 346/11 |
| 5,192,958 | 3/1993 | Charnitski ............................ 346/107 R |
| 5,208,818 | 5/1993 | Gelbart et al. ............................ 372/30 |
| 5,228,675 | 7/1993 | Didier ...................................... 271/105 |
| 5,263,700 | 11/1993 | Tubb et al. ................................ 271/20 |
| 5,276,465 | 1/1994 | Menard et al. .......................... 346/134 |
| 5,290,023 | 3/1994 | Sasaki et al. ............................. 271/20 |
| 5,299,498 | 4/1994 | Spiegel et al. ........................... 101/477 |
| 5,433,426 | 7/1995 | Bond ......................................... 271/92 |
| 5,488,906 | 2/1996 | Iron et al. ............................... 346/138 |
| 5,619,246 | 4/1997 | Straayer et al. ......................... 347/262 |

FOREIGN PATENT DOCUMENTS

| | | |
|---|---|---|
| 0 558 078A1 | 5/1930 | European Pat. Off. ......... B41M 5/30 |
| 0 017 983 A1 | 10/1980 | European Pat. Off. . |
| 5-254158 | of 0000 | Japan ................. B41J 2/32 |
| 63-299951 | 9/1993 | Japan ................. B41J 3/20 |
| 1053447 | 5/1965 | United Kingdom . |
| 1150003 | 6/1966 | United Kingdom . |
| 1 240 164 | 7/1971 | United Kingdom . |
| 1 260 277 | 1/1972 | United Kingdom . |
| 1 402 971 | 8/1975 | United Kingdom . |

*Primary Examiner*—Mark J. Reinhart
*Attorney, Agent, or Firm*—McCormick, Paulding & Huber

[57] ABSTRACT

A photoplotting apparatus is provided. The apparatus comprises an internal drum plotter and a media sheet handling apparatus for sequentially delivering a photosensitive media sheet to the photoplotter for exposure from a stack of such sheets. The photoplotter has reduced turbulence within the drum during exposure of the media sheet, and the sheet handling apparatus includes means for separating the sheets in the stack from interleaves disposed between adjacent sheets in the stack.

17 Claims, 9 Drawing Sheets

IMAGING DEVICE AND MEDIA HANDLING APPARATUS

BACKGROUND OF THE INVENTION

The present invention relates generally to imaging devices and to an improved media handling apparatus for delivering photosensitive media sheets to an imaging device for exposure. More particularly, the invention relates to an internal drum photoplotter having reduced turbulence within the drum during exposure of photosensitive media sheets, and to an improved media handling apparatus for separating individual media sheets from a stack of such sheets and delivering the removed sheets to an imaging device such as the aforementioned internal drum photoplotter.

Plotters of the type being considered here typically include a drum having a laser scanner mounted near or within the drum's interior for directing radiation onto a photosensitive media according to image data stored in an associated processor. The plate typically comprises a thin sheet of aluminum or polyester having one surface coated with a photosensitive emulsion. The media may also comprise, for example, a sheet of photosensitive film. Individual sheets are supported for exposure by the scanner on a partially cylindrical support surface defined by a portion of the internal surface of the drum.

Drum plotters of this type also typically include an associated media handling apparatus for delivering photosensitive media sheets to the support surface of the drum for subsequent exposure. The sheets are supplied to the apparatus stacked in a cassette with a paper interleaf disposed between adjacent sheets in the stack. The paper interleaves are provided to help prevent the emulsion coated surface of the sheets for being scratched or otherwise damaged prior to exposure of the sheet.

One problem associated with internal drum plotters is that heat generated by the laser or by other components of the plotter creates air turbulence within the interior of the drum. Such turbulence interferes with the scanner's focus as it directs radiation onto the emulsion-coated plate, thus reducing the quality of the exposure. A second problem associated with such plotters, as well as with other imaging devices for exposing photosensitive media sheets, relates to the media handling apparatus. While, as noted above, the paper interleaves help prevent damage to the emulsion coated surface of the sheet, the interleaves, and to a lesser extent the polyester and aluminum sheets, tend to adopt an electrostatic charge, which causes the interleaves to sometimes adhere to adjacent sheets in the stack as the sheets are sequentially removed from the stack for delivery to the imaging device. In addition to electrostatic bonding, the interleaves can adhere mechanically to adjacent aluminum or polyester underside of the media sheets or can even bond chemically with the emulsion coated on adjacent sheets. Thus, during sequential feeding of the sheets to the imaging device it sometimes occurs that the uppermost sheet in the stack is removed from the stack with the paper interleaf adhering to the sheet. This results in a fault condition which automatically discontinues operation of the imaging device until the paper interleaf is removed from the sheet handling apparatus.

Accordingly, it is an object of the invention to provide an internal drum plotter wherein turbulence generated within the interior of the drum during exposure of the photosensitive media is substantially eliminated.

It is a further object of the invention to provide a media handling apparatus for use with such a plotter or with other imaging devices, wherein the interleaf disposed between the uppermost sheet in the stack and the next adjacent sheet is separated from the uppermost sheet as it is removed by the apparatus for delivery to the imaging device.

SUMMARY OF THE INVENTION

The present invention meets these and other objects by providing, in one aspect, an internal drum plotter for exposing a photosensitive media sheet including a drum having an interior surface defining an exposure chamber within the interior of the drum, and a radiation source for exposing the sheet by generating and controllably directing radiation onto the sheet while it is supported within the chamber. The plotter further includes means for substantially eliminating atmospheric turbulence generated in the chamber during exposure of the media.

In the preferred embodiment of the invention, the drum is partially cylindrical and has opposed, spaced apart and generally parallel edge portions which define an opening into the exposure, chamber. The radiation source is a laser scanner supported in or near the exposure chamber, and the means for eliminating the turbulence includes means for establishing a substantially uniform fluid flow along at least a portion of the interior surface of the drum. The preferred embodiment of the invention further includes means for establishing a fluid flow barrier disposed along the opening of the chamber to prevent heat generated outside of the chamber from entering the chamber through the opening.

In a second aspect, the invention provides a media handling apparatus for sequentially removing the uppermost media sheet from a stack of such sheets and then delivering the removed sheet to an imaging device for further processing. Interleaves are disposed between adjacent sheets in the stack, and the apparatus includes clamping means for engaging the uppermost sheet in the stack and the interleaf disposed beneath this sheet to assist in separating the interleaf from the uppermost sheet and to hold the interleaf downwardly against the stack as the uppermost sheet is removed from the stack by the media handling apparatus. An articulated gripping means is provided for disengaging the leading edge of the uppermost sheet in the stack from the clamping means, and lifting the leading edge while holding the back edge of the uppermost sheet against the remainder of the stack. The gripping means then lifts the back edge of the sheet from the stack to remove the sheet from the stack. The media handling apparatus further includes means for directing a controlled flow of compressed air onto the interleaf disposed beneath the uppermost sheet in the stack as the leading edge of the uppermost sheet is lifted by the gripping means. Means are also provided for removing the interleaf from the stack after the uppermost media sheet has been removed by the gripping means. In the preferred embodiment of the invention, the gripping means which removes the uppermost sheet in the stack is also utilized to removed the interleaf sheet.

DETAILED DESCRIPTION OF THE INVENTION

Figure 1:
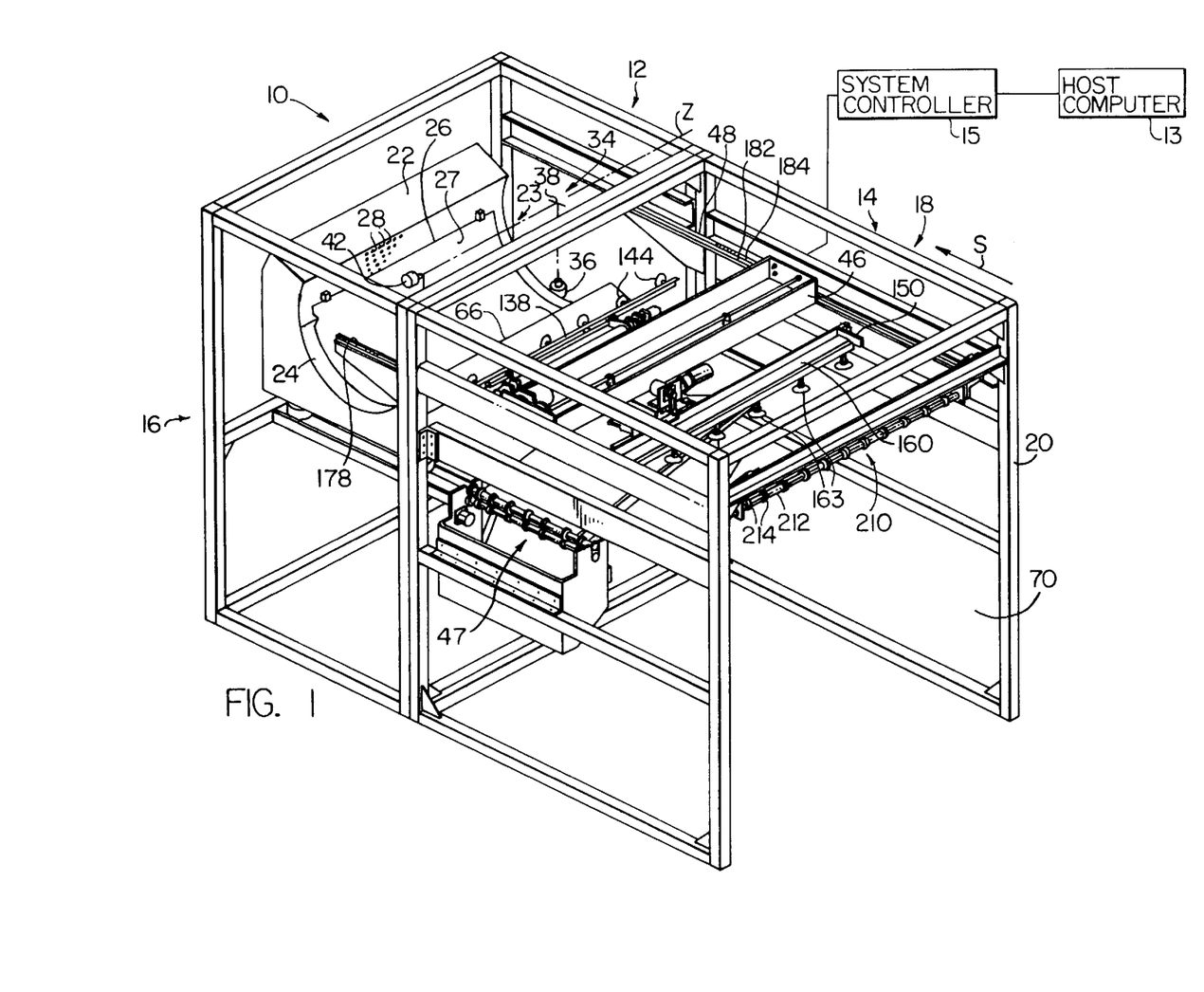
FIG. 1 is a perspective view which illustrates an internal drum plotter and a media handling apparatus embodying the invention.

FIG. 1 illustrates a photoplotting system, generally designated 10, embodying the invention. The apparatus 10 includes an internal drum plotter 12 and a media handling apparatus 14 supported, respectively, within separate, generally box-shaped structures 16 and 18 defined by frame 20. The structures 16 and 18 are connected as modules to create the photoplotting system 10, but the internal drum plotter 12 and the media handling apparatus 14 may, if desired, be operated separately from one another.

The photoplotting system 10 is specifically adapted for use in light-tight applications and is enclosed for this purpose within an enclosure, not shown, which includes light-tight doors permitting access to the internal drum plotter 12 and the media handling apparatus 14. As is conventional, the photoplotting system 10 is fully automated, i.e., the operation of the photoplotter 12 and the media handling apparatus 14 is directed by a host computer 13 linked to a system controller 15 for managing image information downloaded from the computer and for controllably moving the components of the system according to command signals issued from the computer.

Figure 2:
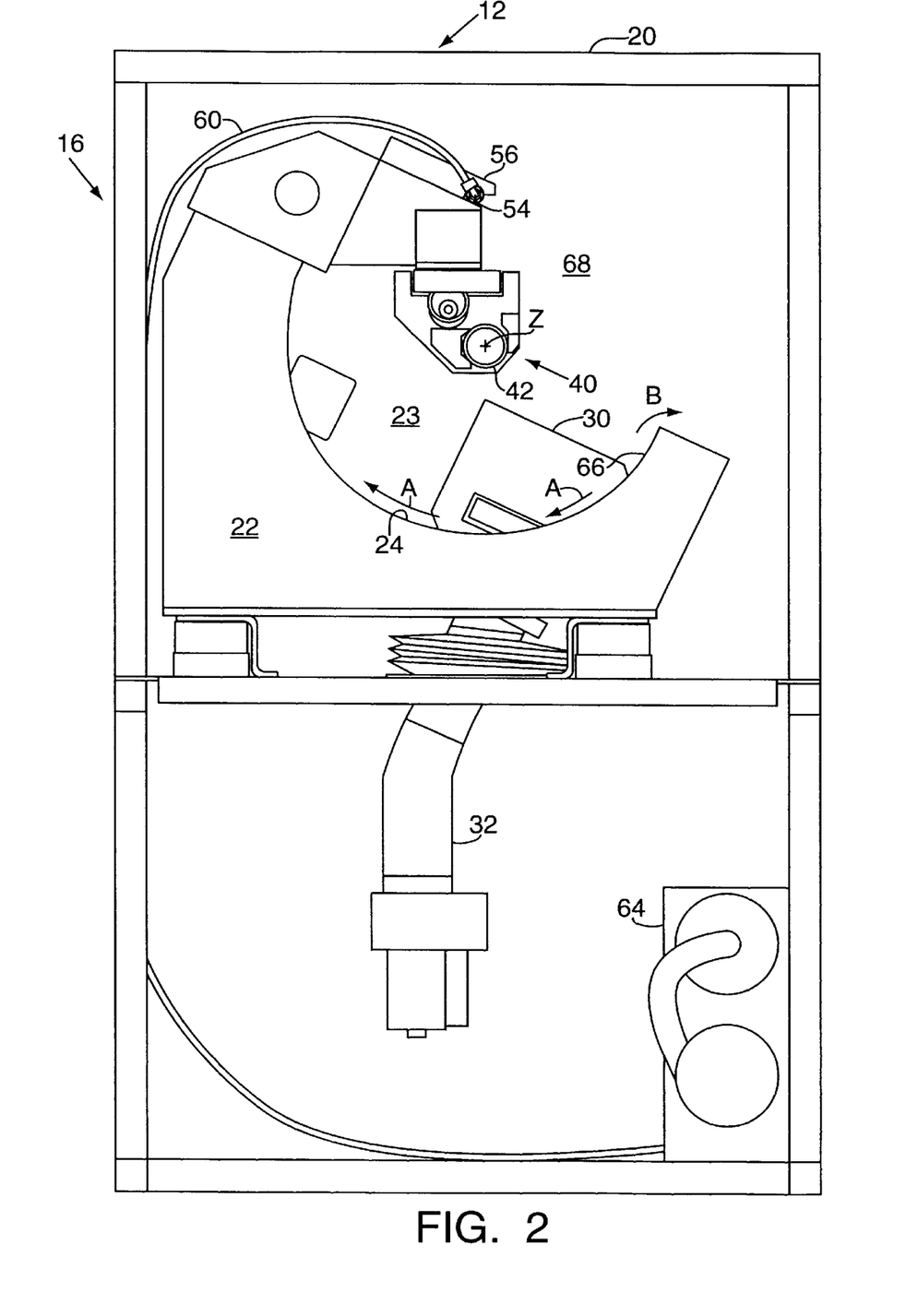
FIG. 2 is a side view of the drum and exposure chamber which forms a part of the plotter illustrated in FIG. 1.

Referring now to FIGS. 1 and 2, the internal drum plotter 12 includes a partially cylindrical, generally crescent-shaped drum 22 defining an exposure chamber 23. The interior surface of the drum defines an internal support surface 24 for supporting a media sheet 26 within the exposure chamber 23 in a given orientation relative to a point along the indicated central axis Z. As noted above, the sheet 26 is typically formed from a sheet of aluminum or polymer, such as polyester, having a photosensitive emulsion 27 coated on one surface thereof. Of course, the sheet 26 could be, for example, a sheet of photosensitive film.

A plurality of apertures 28 defined by the support surface 24 are provided for the purpose of drawing the plate 26 down onto the support surface under vacuum pressure applied by a vacuum generator and associated manifold system (not shown) disposed below the drum 22 in the lower portion of the structure 16.

The plotter 12 further includes a scanning means 34 comprising a laser 36 secured to the drum 22, and a light re-directing mirror 38 secured to the frame 20 so as to re-direct light emitted from the laser 36 coincidentally along the central axis Z of the drum 22. The scanning means 34 further comprises a spinner assembly 40 including an off-axis parabolic mirror 42 for causing the light directed along the Z axis to be turned orthogonally toward the support surface 24, focused on the emulsion coated surface 27 of the plate 26, and swept through a given arc across the surface 27, in raster format. While not shown for the purpose of clarity, the spinner assembly 40 is movably mounted along the axis Z by a way system which is secured to and cantilevered outwardly of the drum 22.

For a more complete description of the construction of the drum 22 and the operation of the scanning means 34 reference may be had to commonly assigned U.S. Pat. No. 5,276,465, entitled PLOTTER DRUM, issued Jan. 4, 1994 to Menard et al., and to copending application Ser. No. 08/117,612, filed Sep. 7, 1993 and entitled APPARATUS AND METHOD FOR POSITIONING PHOTOSENSITIVE MEDIA ON AN EXPOSURE PLATEN. The disclosure of the '612 application is herein incorporated by reference Turning now to the structure of the media handling apparatus 14, it can be seen in FIGS. 1 and 4 that the apparatus includes a main carriage 46 mounted for movement in the indicated S direction of travel along rails 48, 48 (only one shown in FIG. 1) secured to frame 20. The main carriage 46 moves in the S direction of travel between a home position S1, corresponding to the location of a stack of photosensitive media sheets 26, 26, an end travel position S2 where the main carriage 46 deposits a media sheet 26 onto the internal support surface 24, and a discharge position S3 located at a discharge station 47 where a previously exposed plate is removed from the photoplotting apparatus 10. The plate handling apparatus 14 further includes a secondary carriage 50 carried by the main carriage 46 and moveable with respect to the main carriage in the S direction of travel along a way 52 secured to the main carriage. The structure of the main carriage 46 and the secondary carriage 50 will be described in further detail further below.

Figure 3:
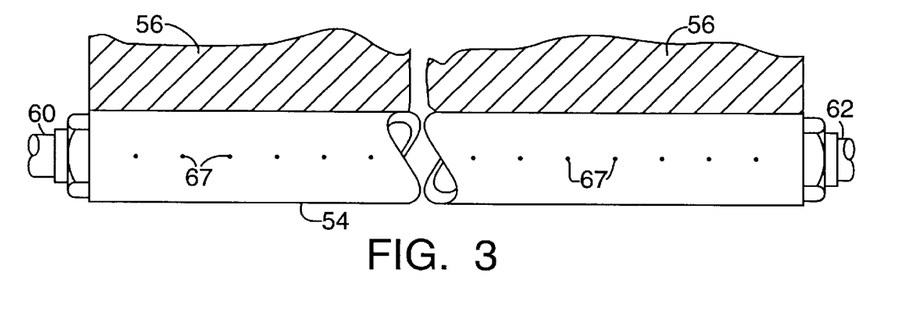
FIG. 3 is a partial front view of the drum and exposure chamber illustrated in FIG. 2.

Returning again to the description of the internal drum plotter 12 and referring in particular to FIGS. 1, 2 and 3, those skilled in the art will recognize that the laser 36 generates a substantial amount of heat in the chamber 23 during exposure of the photosensitive emulsion 27. Typically, the laser 36 has a power rating in the range of about 4000 watts, and the heat generated by the laser creates turbulence within the atmosphere of the chamber 23 which interferes with the ability of the spinner assembly 40 to properly focus laser light on the emulsion coated surface 27. Some of the heat generated by the laser is removed from the chamber 23 by the blower unit 30 and associated duct 32 which vents the heat to the outside of the plotter. However, the unit 30 does not remove sufficient heat to eliminate heat generated turbulence within the chamber. Turbulence within the atmosphere of the chamber 23 is also created by other heat generating components of the plotter 12, such as, for example, power supplies employed within the plotter.

Accordingly, the plotter 12 includes a tube 54 extending axially along the length of the drum 22 and fixedly mounted to the drum at either end by clamps 56. The tube 54 is also connected at either end by a hose 60, 62 which are connected to a compressed air supply 64 to provide a balanced supply of compressed air to the tube. Air delivered to the tube 54 via the hoses is directed along the lower edge 66 of the drum 22 through a plurality of apertures 67, 67 defined by the tube. The apertures are configured and positioned so that a portion of the air directed onto the lower edge of the drum by the apertures is deflected in the direction indicated by arrow to a establish a uniform flow of air along at least that portion of the support surface 24 which is coextensive with the plate 26. This uniform flow of air along the surface 24 dissipates the eddies of turbulence created in the atmosphere of the chamber 23 by the heat from the laser 36 and other heat-generating components of the plotter, and thus improves the quality of the scanning operation performed by the scanning means 34. That is, once the turbulence within the exposure chamber 23 is eliminated by the air flow, the light reflected from the parabolic mirror 42 can be precisely focused on the emulsion coated surface 27 resulting in a sharp, clear image on the exposed plate.

In the illustrated embodiment of the invention, the apertures 67, 67 are also configured and positioned so that a portion of the air directed along the lower edge 66 of the drum 22 is deflected in the direction indicated by arrow B into the opening 68 of the drum which provides access for the media sheets 26 delivered to the drum by the media handling apparatus 14. The flow of air into the opening 68 establishes a fluid barrier or curtain which reduces the amount of heat entering the exposure chamber 23 from the structure 18. Again, this results in less turbulence within the atmosphere of the chamber. Thus, the operation of the scanning means 34 is improved and a sharper and clearer image is provided on the exposed plate.

It should be understood here that the invention is not limited to the use of compressed air or to the use of the tube 54. Any inert gas may be used to establish the uniform fluid flow along the support surface 24 and into the opening 68, and any other suitable means for establishing such a fluid flow may be substituted. For example, a plurality of apertures could be formed along the lower edge 66 of the drum 22 and connected to a source of compressed air or other suitable gas to direct a uniform fluid flow along the surface 24 and into the opening of the drum.

Turning again to a discussion of the media handling apparatus, and to FIGS. 1, 2 and 5–7(a), the frame 20 defines a receiving bay 70 within structure 18 for receiving a tray-shaped supply cassette 72 which contains a stack 74 of media sheets 26, 26. As noted above, a paper interleaf 75 is disposed between adjacent sheets in the stack, which protects the emulsion coated surface 27 of the sheet 26 from being scratched or otherwise damaged. The cassette 72, shown within the apparatus 14 by the broken lines in FIG. 2, in perspective in FIG. 5, and in section in 6, includes a forward wall 76, a rear wall 78, two opposed side walls 80, 82 and a removable roll top or tambour cover 84 which when in the closed position renders the cassette light-tight. The cover is selectively opened and closed by the media handling apparatus through an actuator and depending hook-like member (not shown) which grasps a projection 85 extending upwardly from the cover. The manner in which the plate handling apparatus operates to open and close the cover 84 is fully disclosed in copending application 08/117,612 incorporated by reference above.

Figure 4:
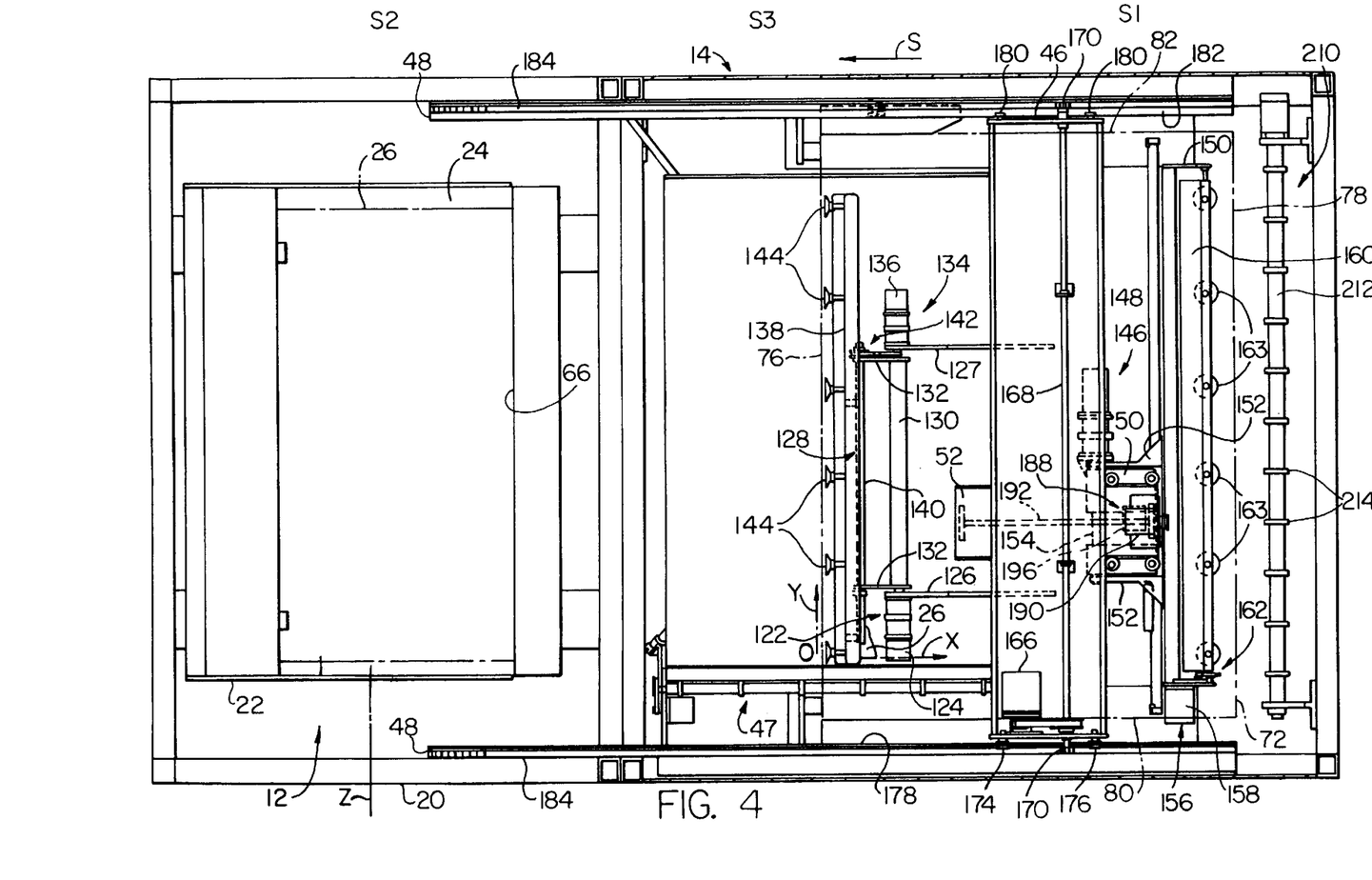
FIG. 4 is a top view of the media handling apparatus illustrated in FIG. 1.
Figure 5:
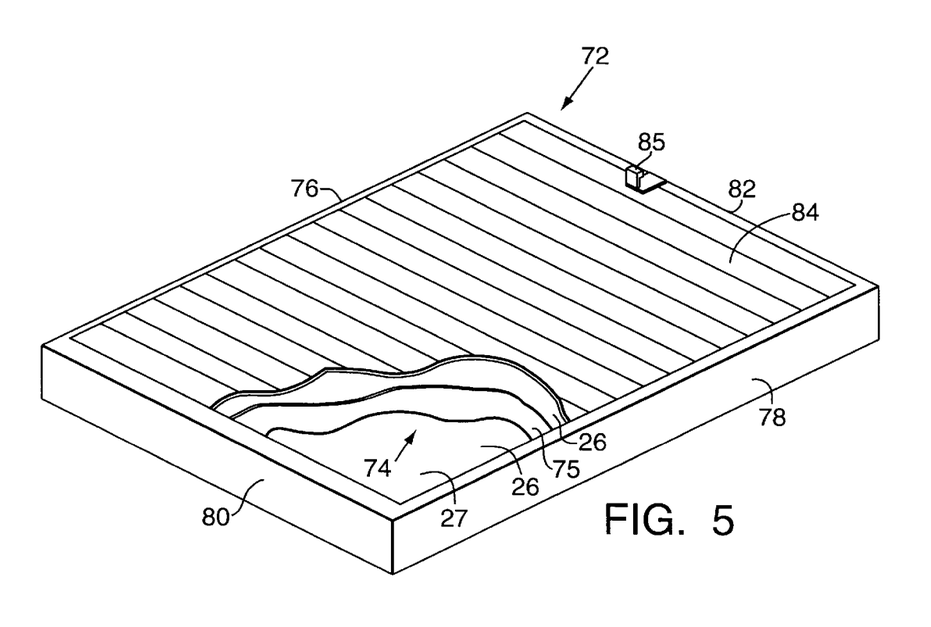
FIG. 5 is a perspective view of the cassette which forms a part of the media handling apparatus illustrated in FIG. 4.

The sheets 26, 26 stacked within the cassette 72, although uniform in size and shape, may nevertheless vary in size from stack to stack. Typically, the sheets 26, 26 have a maximum size of 42 inches×32 inches, and a minimum size of 26 inches×20 inches or less, with the larger dimension being the dimension taken parallel to the axis Z. Regardless of their size, the sheets contained within the cassette are uniformly justified to a given datum. As illustrated in FIG. 4, this datum is indicated by the point O corresponding to the intersection of the indicated X and Y coordinate axes. That is, each sheet in the stack 74 has its lower left corner abutting the forward wall 76 of the cassette extending along the Y axis and the side wall 80 of the cassette extending along the X. In this way, the leading edge 83 of the sheets 26, 26 lie coincidentally with the Y axis, which is disposed parallel to the Z axis, while the side edge 87 of each sheet lies coincidentally with the X axis.

Figure 6:
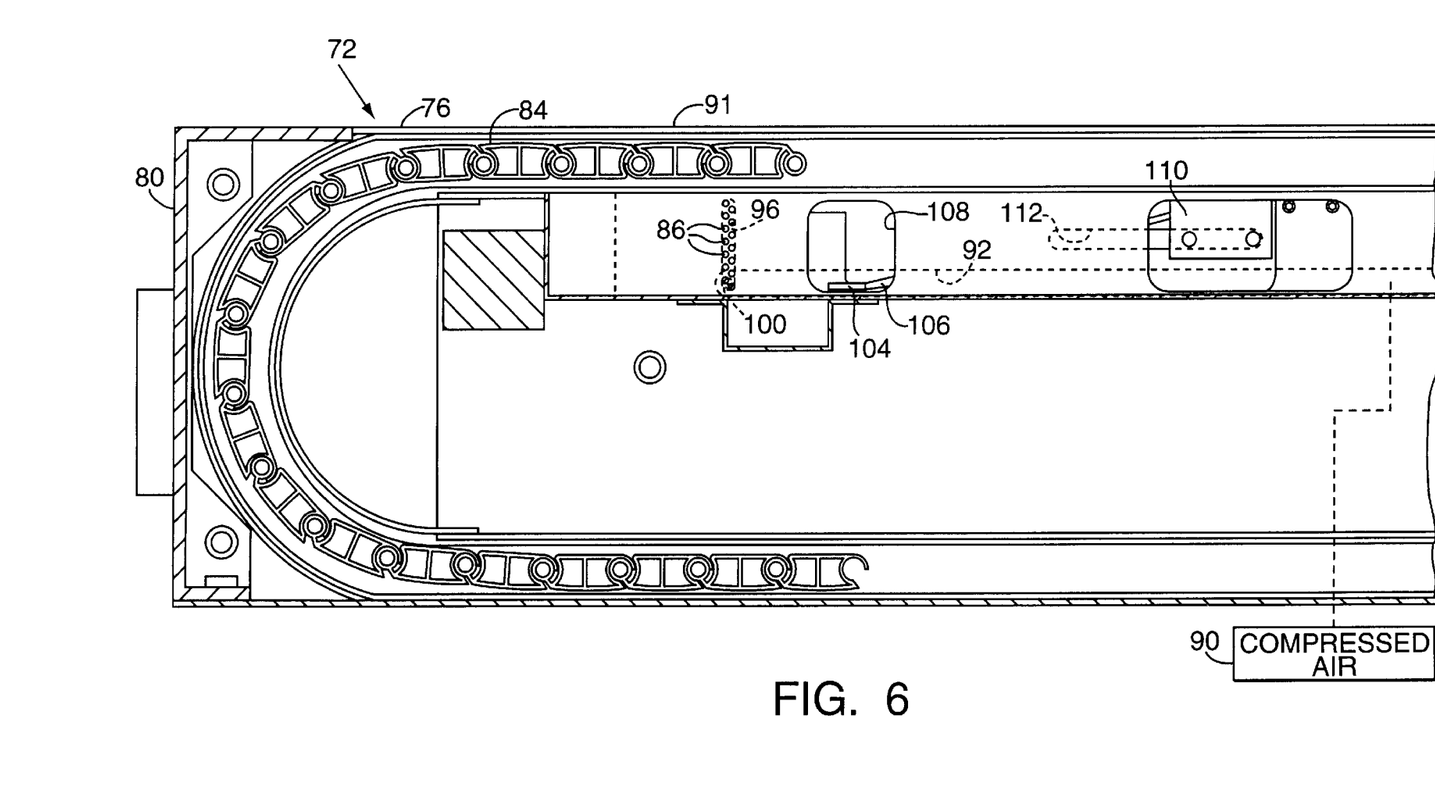
FIG. 6 is an enlarged fragmentary section of FIG. 5.
Figures 7, 7A:
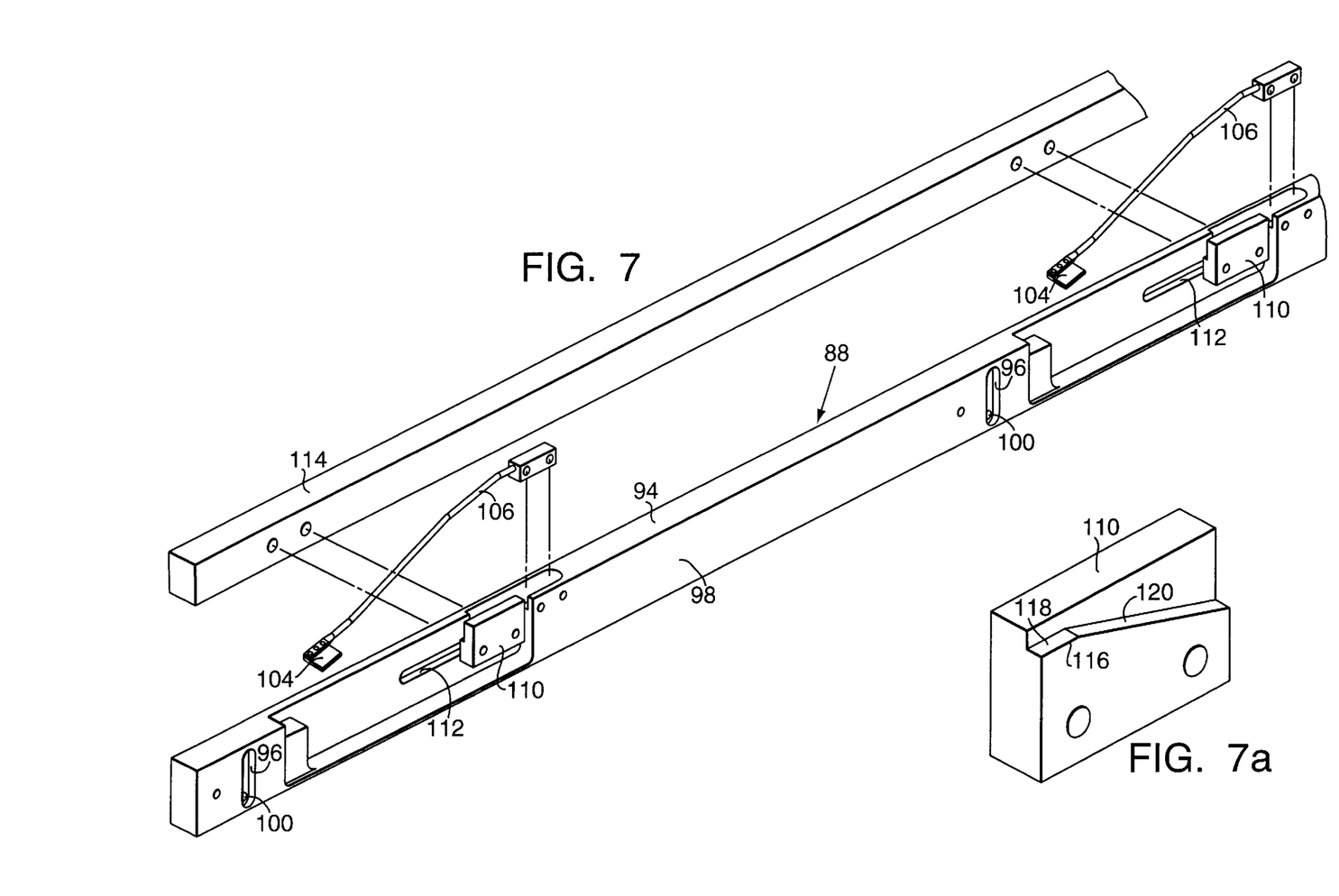
FIG. 7 is an exploded view of the manifold which forms a part of the cassette illustrated in FIG. 5.
FIG. 7(a) is a perspective back view of the slider which forms a part of the cassette illustrated in FIG. 5.

Referring to FIGS. 6–7(a), and the cassette 72 in more detail, the forward wall 76 of the cassette defines a plurality of apertures or nozzles 86, 86 arranged in three groupings (one shown) spaced along the wall. The nozzles communicate via a manifold 88 formed within the forward wall of the cassette with a source 90 which controllably delivers a supply of compressed air. Compressed air from the source 90 is supplied to the manifold via a conduit (not shown) which connects the source 90 with an aperture (also not shown) defined by the back face 91 of the forward wall 76. The air is then channeled to an elongated slot 92 formed in the back wall 94 of the manifold 88. Vertical slots 96, 96 defined by the front wall 98 of the manifold 88, at locations corresponding to the locations of the nozzles 86, 86 defined by the forward wall 76 of the cassette, communicate with the elongated slot 92 via through-holes 100, 100. Thus, the nozzles 86, 86 are in fluid communication with the source of compressed air 90, which enables the nozzles to controllably direct a flow of compressed air onto the stack 74 in a manner that will be explained further below.

As can also be seen from FIGS. 6 and 7, the manifold 88 houses a plurality of tabs 104, 104, respectively supported by compound springs 106, 106 mounted to the front wall 98 of the manifold. The tabs are moveable between a clamping position wherein the tabs protrude through openings 108, 108 defined by the forward wall 76 of the cassette 72 and are in clamping engagement with the uppermost sheet 26 in the stack 74 [see FIG. 9(a)] or the interleaf 75 [see FIG. 9(d)], and a non-clamping position wherein the tabs are disposed above the uppermost sheet in the stack and retracted within the manifold 88.

The tabs 104, 104 are moveable between the clamping and non-clamping position by slides 110, 110 which are respectively slidably engageable with the compound springs 106, 106. The slides are mounted for movement on the manifold within the confines of a plurality of horizontal slots 112, 112. As can be seen in FIG. 7, the slides are connected by a slide bar 114 for simultaneous movement between the clamping and non-clamping positions. In the illustrated embodiment of the invention, the bar is operated manually to move the slides 110, 110 within the slots 112, 112 and selectively place the tabs 104, 104 in the clamping or non-clamping positions. However, it should be understood that the slide bar 114 could be operated automatically such as, for example, by the use of a solenoid.

As shown in FIG. 7(a), each of the slides has a shoulder 116 including a generally horizontal surface 118 and a generally inclined surface 120. As the slides are moved in engagement with the compound springs 106, 106, the surfaces 118 and 120 cooperated with the springs to, in one direction of movement, lift the tabs from the uppermost plate in the stack and retract the tabs through the openings 108, 108 into the manifold 88. As the slides 110, 110 are move in the opposite direction in engagement with the springs, the tabs protrude outwardly through the openings 108, 108 and are lowered down onto the uppermost plate in the stack. The advantage of having the tabs moveable between the clamping and non-clamping position will be explained below in connection with a description of the manner in which the media handling apparatus removes the uppermost sheet in the stack 74 for delivery to the exposure chamber 23.

Figure 8:
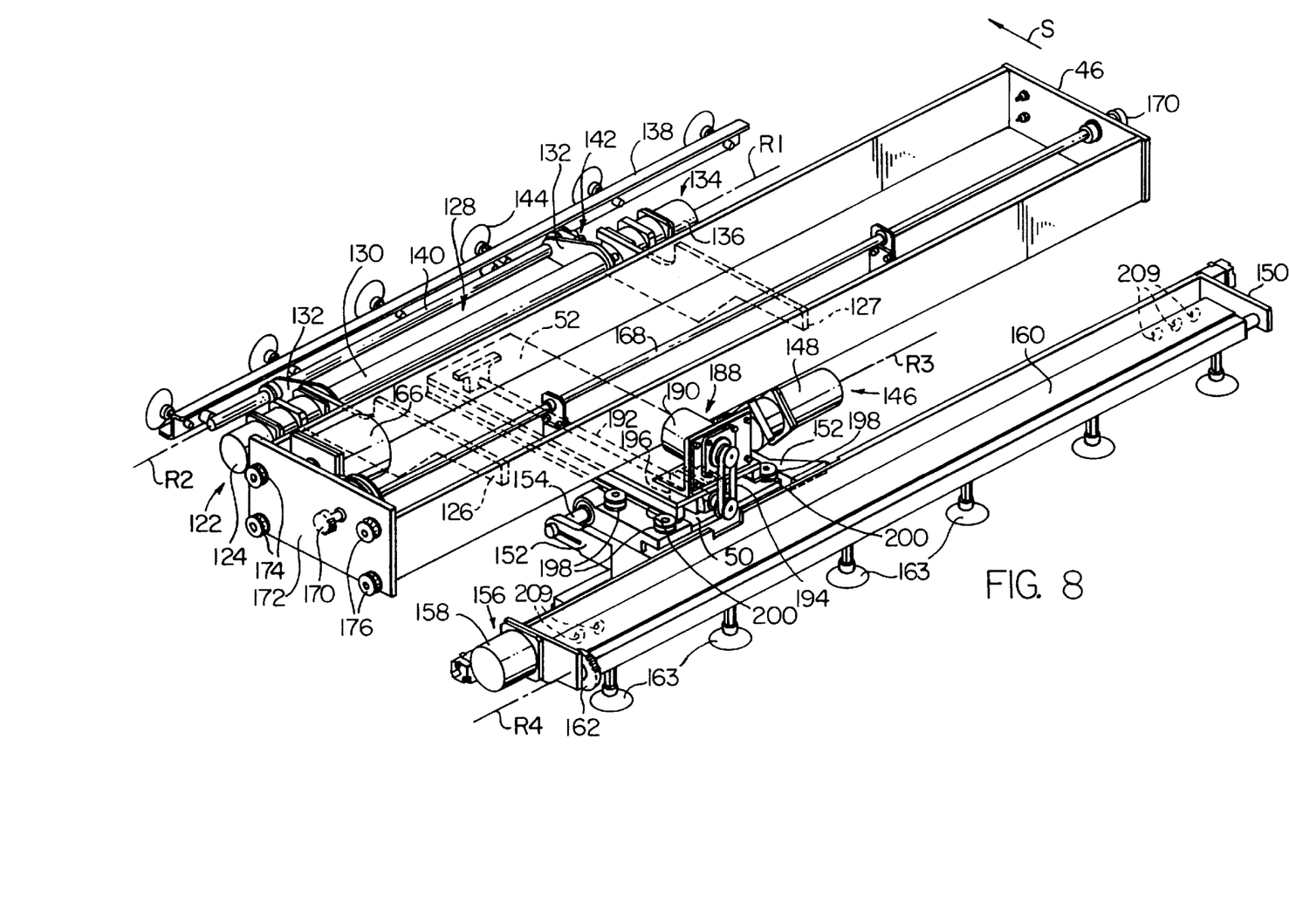
FIG. 8 is perspective view of the gripping device which forms a part of the media handling apparatus illustrated in FIG. 4.

Before describing the procedure for sequentially removing the uppermost plate in the stack 74, a more detailed description of the media handling apparatus 14 is required. Referring to FIGS. 4 and 8, it can be seen that a first rotational drive means 122 including a first positioning motor 124 is mounted on the main carriage 46 by mounting arms 126, 127. The motor 124 is mounted on arm 126 and rotates a generally U-shaped yoke member 128 formed by a transverse bar 130 and two spaced subarms 132, 132. The yoke is journaled within the support arms 126, 127 and is drivingly connected to the drive motor 124 so as to cause the transverse bar 130 to be rotated about the R1 axis.

The mounting arms 126, 127 also support a second rotational drive means 134 having a second positioning motor 136 for rotating a pick up bar 138 about a second rotational axis R2 which is spaced outwardly and parallel to the rotational axis R1. Journaled within the subarms 132, 132 is a rotating bar 140 which is connected for unitary rotational movement with the pick up bar 138 about the R2 axis. The positioning motor 136 is mounted on arm 127 and is drivingly rotatably coupled to the pick up bar 138 by a notched belt pulley system 142 connected between the output sprocket of the motor 136 and the rotating bar 140. Disposed along the length of the pick up bar 138 are a plurality of gripper elements 144, 144 which are individually connected to a vacuum source for the purpose of engaging leading edge 83 of the uppermost plate 26 in the stack 74 and lifting it upwards for subsequent handling in a manner that hereafter will become apparent.

The secondary carriage 50 includes a third rotational drive means 146 having a third positioning motor 148 for rotating a locating bracket 150 about a third rotational axis R3. The locating bracket includes two spaced apart clamping arms 152, 152 rigidly connected to the bracket and clamped to a second rotating bar 154 so that the drive motor 148 controllably rotates the second rotating bar 154 and the two clamping arms 152, 152 which connect the bracket 150 to the secondary carriage for rotation about the R3 axis. Mounted on the locating bracket 150 is a fourth rotational drive means 156 which includes a fourth positioning motor 158 for controllably rotating a second pick up bar 160 about a fourth rotational axis R4. The second pick up bar 160 is journaled in the bracket 150 so as to be controllably rotated about the R4 axis by a gear drive system 162. A plurality of suction gripper elements 163, 163 are secured to the second pick up bar 160 and are each separately connected to a vacuum source for controlled pickup of the back edge 165 of the uppermost plate 26 in the stack 74.

The main carriage 46 includes a drive motor 166 which is drivingly coupled to a drive bar 168 having pinion gears 170, 170 non-rotatably mounted on the drive bar to effect movement between the indicated S1 and S2 positions. Disposed on one lateral side face 172 of the main carriage 46 are two pairs of vertically space guide rollers 174, 174 and 176, 176, each roller having a circumferential groove formed in it to mate with a horizontally disposed way 178 secured to the frame 20. In a similar manner, two pairs of vertically space smooth rollers 180, 180 are disposed on the opposite face of the main carriage and travel along a way 182, fixed to the frame 20 in parallel spaced relationship to the way 178. Disposed vertically above the ways on each side of the frame 20 are elongate racks 184, 184 which mesh with the pinion gears 170, 170 disposed on opposite sides of the main carriage 46. Thus, by activating the drive motor 166, the main carriage 46 is caused to move between the S1, S2 and S3 positions.

The secondary carriage 50 is linearly moveable on the way 52 relative to the main carriage 46 through a secondary drive means 188. The secondary drive means includes a second linear motor 190, a lead screw 192 drivingly coupled to the output shaft of the motor through a drive belt 194, and a drive nut 196 secured against movement to the carriage 50 so as to convert the otherwise rotary movement provided by the drive motor 190 into linear controlled movement back and forth along the indicated S direction of travel. The secondary carriage 50 further includes two pairs of rollers 198, 198, each having a circumferential grooved formed in it for cooperating with correspondingly formed guide edges 200, 200 disposed on the way 52 in a parallel orientation along opposite side edges thereof.

Having described the structure of the media handling apparatus in sufficient detail, the procedure for removing the uppermost sheet in the stack will be considered. Referring in particular to FIGS. 4 and 8–9(a–d), as the cycle begins for the removal of the uppermost sheet, the media handling apparatus, under the direction of the central processor 13 and the system controller 15, initially locates the main carriage 46 at the S1 position above the cassette with the gripper elements 144 and 163 oriented in a depending position. The controller then causes the positioning motors 124, 136, 148 and 158 respectively associated with the R1, R2, R3 and R4 axis drive means to rotate the first and second pick up arms 138 and 160 downwardly so as to cause the respective rows of gripper elements 144, 144 and 163, 163 to engage the uppermost sheet 26 in the stack 74. Along with this motion, vacuum is introduced to both rows of gripper elements to seal the emulsion coated surface 27 of the plate 26 to the gripping elements.

Figure 9A:
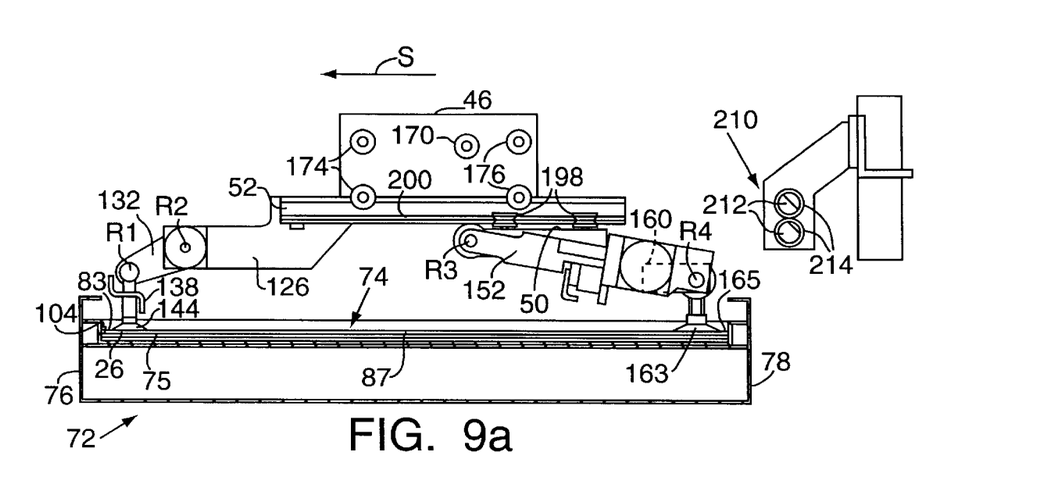
FIG. 9(a) is a schematic view of the gripping device illustrated in FIG. 8 gripping the leading and back edges of the uppermost media sheet in the cassette stack in preparation for removing the sheet from the stack.

Thereafter, the drive motor 166 of the main carriage 46 is activated to move the carriage away from the drum 22 in a direction opposite to the indicated S direction a sufficient distance to slide the uppermost sheet 26 almost out from under the tabs 104, 104 and allow the leading edge 85 of the sheet to clear the forward wall 76 of the cassette when the leading edge is subsequently lifted as described below.

At this point it should be noted that when the cassette 72 is received within the bay 70 the slide bar 114 is positioned so that the tabs clamp firmly down onto the uppermost plate in the stack to maintain the stacked plates and interleaves in proper registration. Simultaneously with the movement of the main carriage 46, secondary drive means 188 is activated and drive motor 190 is caused to move the secondary carriage 50 in a direction opposite to the indicated S direction of travel. The compound motion of the main and secondary carriages cause the uppermost sheet 26 to imperceptibly bow upwardly with respect to the remainder of the stack.

Figure 9B:
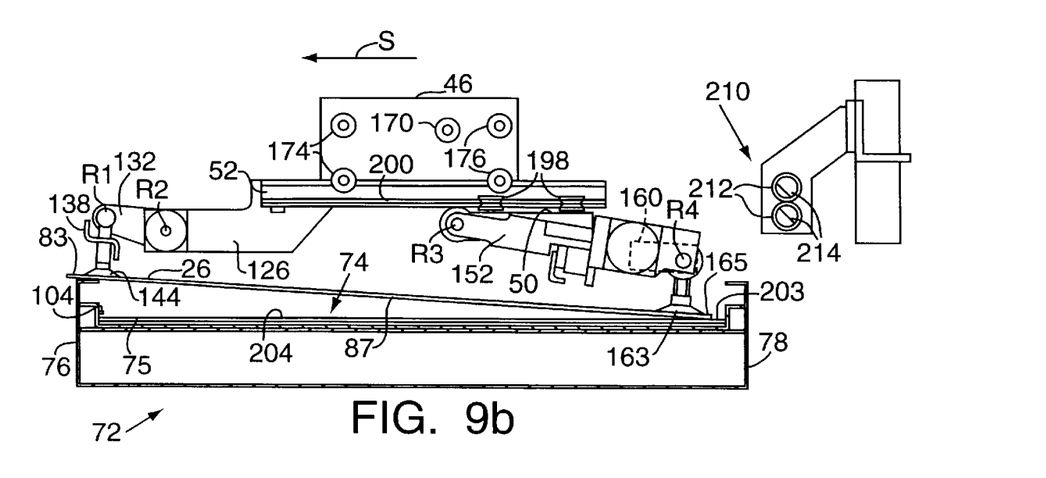
FIG. 9(b) is a schematic view of the gripping device illustrated in FIG. 8 lifting the leading edge of a photosensitive media sheet from the cassette shown in FIG. 5.

The drive motors 166 and 190 are deactivated and the R1 and R2 drive motors are reversed to begin lifting the leading edge 83 of the sheet 26 from the stack:. As the leading edge is lifted it slips from beneath the tabs 104, 104, and as this occurs the tabs create a shearing action or wiping force on the emulsion coated surface 27 and the edge of the sheet. This wiping motion assists in disengaging the leading edge 202 of the interleaf 75 from the uppermost sheet 26. When the leading edge 83 of the sheet 26 clears the tabs 104, 104, the tabs then move to clamp the leading edge 202 of the interleaf 75 down onto the stack.

At the same time, the controller activates the compressed air source 90 to deliver pulses of compressed air to the spaced groups of nozzles 86, 86, which direct the pulsed air onto and across the upper surface 204 of the interleaf 75. Accordingly, the pulsed air further assists in separating the paper interleaf 75 from the sheet 26 and pins the interleaf firmly against the remainder of the stack 74 as the leading edge of the sheet 26 is lifted.

Controlling the strength of the air pulses and the direction of flow provided by the nozzles is critical. The pulses must be strong enough and the flow must be properly directed so that the air pulses help to shear the paper interleaf from the underside of the sheet 26 and hold it firmly against the remainder of the stack. However, the pulses must not be so strong or the flow of air directed upwardly or downwardly with respect to interleaf in a manner which causes the interleaf to ruffle, lift from beneath the tabs 104, 104 and possibly pin itself to the bottom surface of the sheet.

When the leading edge 83 of the sheet is lifted far enough to clear the forward wall 76 of the cassette, the air source 90 is deactivated. Drive motor 166 is again activated, but at this point the drive is reversed and the main carriage 46 is moved in the indicated S direction so that the leading edge of the sheet 26 extends in the S direction slightly beyond the forward wall of the cassette. Simultaneously with this movement of the main carriage in the S direction, the secondary drive means 188 is activated and the drive motor 190 compensates for the movement of the main carriage 46 and stabilizes the back edge 165 of the sheet by moving the secondary carriage in a direction opposite to the indicated S direction.

Figure 9C:
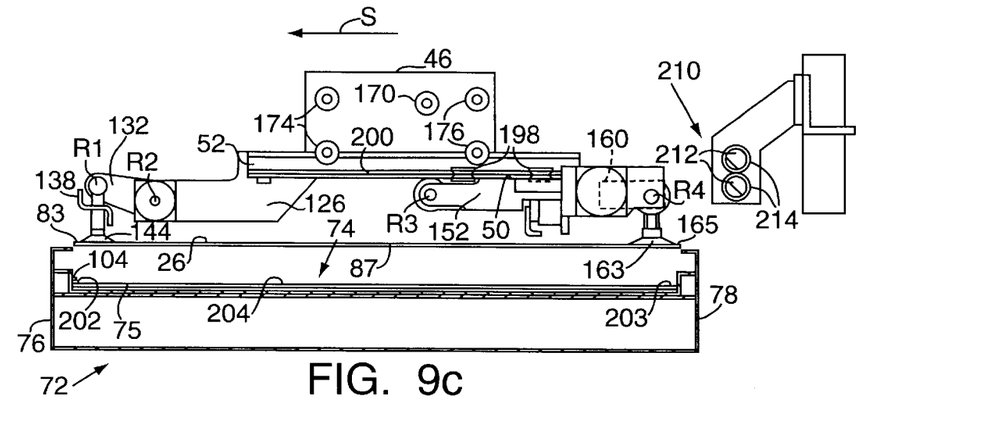
FIG. 9(c) is a schematic view of the gripping device illustrated in FIG. 8 lifting the back edge of the photosensitive media from the cassette.

When the back edge of the sheet has been stabilized, the drive motors 166 and 190 are again deactivated, and the R3 and R4 drive motors are reversed to begin lifting the back edge 165 of the sheet from the stack. At the same time, the system controller 15 again activates the compressed air source 90, but this time a constant stream of air is directed onto and across the upper surface 204 of the interleaf 75 by the nozzles 86. In this way, the paper interleaf is kept firmly pressed against the remainder of the stack as the back edge of the sheet 26 is lifted.

Once the plate 26 has been lifted so as to completely clear the cassette, as shown by the position of the plate in FIG. 9(c), the R3 and R4 drive motors are deactivated. The main carriage drive motor 166 is again activated to move the carriage 46 slightly in a direction opposite to the indicated S direction of movement. This slight movement of the carriage away from the drum 22 tends to break any mechanical bonds that may exist between the underside of the sheet 26 and the interleaf 75, causing the two to adhere to one another. The breaking of such mechanical bonds is also assisted by the constant stream of air still flowing across the interleaf.

Figure 9D:
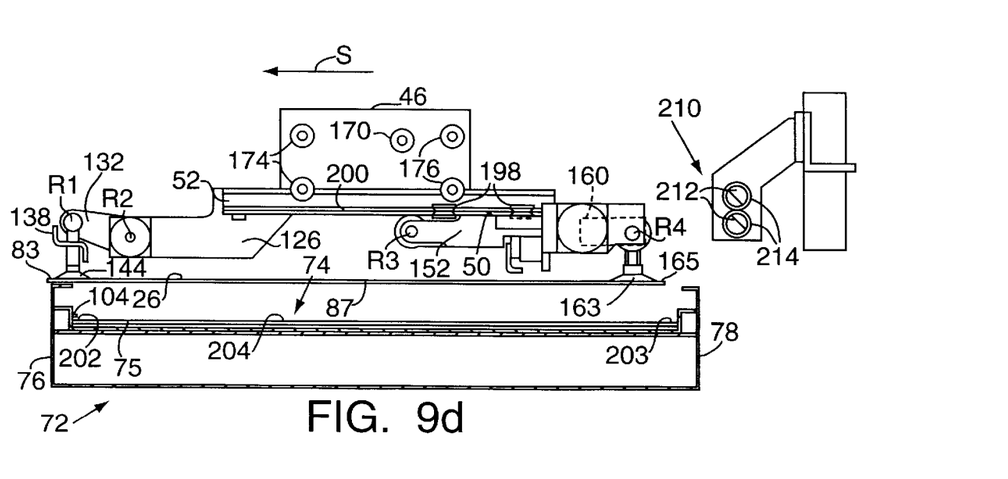
FIG. 9(d) is a schematic view of the gripping device preparing to remove the sheet from the cassette and deliver the sheet to the plotter drum illustrated in FIG. 2.

The drive of the main carriage drive motor 166 is then reversed to move the carriage 46 in the S direction of travel and deliver the sheet 26 to the drum 22 for processing. However, the constant flow of air delivered by the source 90 through the nozzles 86, 86 is not turned off until the back edge 165 of the sheet 26 has moved past the forward wall 76 of the cassette 72. The operation of the media handling apparatus 14 from this point on is identical to that fully disclosed in the above-referenced copending application and will, therefore, not be further discussed herein.

After the uppermost sheet 26 has been lifted from the stack and removed to the drum 22, the sheet handling apparatus has the additional task or removing the paper interleaf 75 so that the next plate in the stack can be lifted and delivered to the drum. This is accomplished by again returning the main carriage 46 to the S1 position. Once the carriage has returned to this position, the second pick up bar 160 is rotated such that its back face is facing downward toward the interleaf 75. This positions vacuum holes 209, 209 in confrontation with the upper surface 204 of the interleaf. Vacuum is then applied through the holes 209, 209, which draws up the trailing edge 203 of the interleaf. The second pick up bar is thereafter rotated about the R4 axis to direct the trailing edge 203 of the interleaf toward an interleaf discharge means 210. Simultaneously with this motion, the second pick up bar is advanced to feed the trailing edge of the interleaf into a pair of counter rotating rollers 212, 212, which form a part of the discharge means 210. A plurality of gripping members 214, 214 supported on the rollers assist in gripping the interleaf and removing it from the apparatus as the trailing edge of the interleaf is brought into contact with the rollers.

Once the paper interleaf 75 is removed, the plate handling apparatus resumes its S1 position and the apparatus is ready to begin another cycle for removal of the next sheet in the stack.

While preferred embodiments have been shown and described, various modifications and substitutions may be made without departing from the spirit and scope of the invention. Accordingly, it is to be understood that the present invention has been described by way of example and not by limitation.

We claim:

1. An internal drum plotter for exposing photosensitive media comprising:

a drum having an interior surface defining an exposure chamber within the interior of the drum;

a radiation source for generating and controllably directing radiation onto photosensitive media supported within the chamber to expose the media; and means for establishing a substantially uniform fluid flow along at least a portion of the interior surface of the drum, said means defining a plurality of apertures disposed within the chamber and arranged in fluid communication with a source of one of compressed air and an inert gas, said apertures directing one of the compressed air and the inert gas onto the interior surface of the drum to substantially eliminate atmospheric turbulence generated in the chamber during exposure of the media.

2. The apparatus of claim 1, wherein the radiation source for generating and directing radiation onto the photosensitive media is a laser scanner.

3. The plotter of claim 1, wherein the drum is partially cylindrical, said partially cylindrical drum having opposed, spaced apart and generally parallel edge portions defining an opening into the exposure chamber, said plotter further comprising means for preventing heat from entering the chamber through the opening.

4. The plotter of claim 3 wherein the means for preventing comprises means for generating a fluid flow barrier disposed along the opening of the chamber.

5. The plotter of claim 4 wherein the means for generating a fluid flow barrier comprises means for establishing a one of compressed air and an inert gas out of the opening of the chamber.

6. The plotter of claim 5, wherein the means for establishing a flow of one of compressed air and an inert gas out of the opening in the chamber comprises the plurality of apertures.

7. The plotter of claim 6 comprising a tube mounted within the chamber and arranged in fluid communication with a source of one of compressed air and an inert gas, said tube defining the plurality of apertures.

8. A media-handling apparatus for sequentially removing an uppermost media sheet from a stack of said sheets, each of said sheets having a leading edge and a back edge and said stack including interleaves disposed between adjacent sheets in the stack, said apparatus comprising:

clamping means for engaging the leading edge of the uppermost sheet in the stack and an interleaf disposed between the sheet and the next adjacent sheet in the stack for holding the leading edge downwardly against the stack and for assisting in separating the interleaf from the uppermost sheet and holding the interleaf downwardly against the stack as the uppermost sheet is removed from the stack;

articulated gripping means for disengaging the leading edge of the uppermost sheet in the stack from the clamping means, lifting the leading edge while holding the back edge of the uppermost sheet against the remainder of the stack, and subsequently lifting the back edge of the sheet from the stack to remove the uppermost sheet from the stack;

means for directing a controlled flow of compressed air onto the interleaf disposed between the uppermost sheet in the stack and the next adjacent plate in the stack as the leading edge of the uppermost sheet is lifted by the gripping means; and means for removing the interleaf from the stack after the uppermost sheet has been removed by the gripping means.

9. The media handling apparatus of claim 8, wherein the articulated gripping means comprises the means for removing.

10. The media handling apparatus of claim 8, further comprising means for supporting the stack of media sheets within the apparatus.

11. The media handling apparatus of claim 10, wherein the means for supporting the stack of media sheets is a generally tray-shaped cassette for receiving the stack of sheets, said cassette including a forward wall disposed adjacent to the leading edge of the sheets in the stack, a rear wall and opposed side walls.

12. The apparatus of claim 11, wherein the means for directing a controlled flow of compressed air comprises:

a plurality of air nozzles defined by the forward wall of the cassette for directing a flow of compressed air onto and across the interleaf as the leading edge of the uppermost sheet is lifted;

a source of compressed air for controllably delivering a flow of compressed air to the nozzles; and a manifold supported on the forward wall of the cassette for fluidly connecting the nozzles to the source of compressed air.

13. The apparatus of claim 8, wherein the clamping means comprises:

a plurality of tabs for clamping the leading edge of the uppermost sheet in the stack;

a plurality of compound springs, each one of the springs supporting a respective one of the plurality of clamps;

a plurality of slides, each one of the slides movingly engageable with an associated one of the plurality of compound springs; each one of the springs and its associated slide cooperating when the slide is moved to selectively move the tab supported by the spring into and out of engagement with the leading edge of the uppermost sheet in the stack; and means for simultaneously moving the plurality of slides with respect to the plurality of associated compound springs to simultaneously move the plurality of tabs into and out of clamping engagement with the leading edge of the uppermost sheet in the stack.

14. A plate-handling apparatus for sequentially removing an uppermost media sheet from a stack of said sheets, each of said sheets having a leading edge and a back edge and said stack including interleaves disposed between adjacent sheets in the stack, said apparatus comprising:

clamping means for engaging the leading edge of the uppermost sheet in the stack and an interleaf disposed between the sheet and the next adjacent sheet in the stack for holding the leading edge downwardly against the stack and for assisting in separating the interleaf from the uppermost sheet and holding the interleaf downwardly against the stack as the uppermost sheet is removed from the stack;

articulated gripping means for disengaging the leading edge of the uppermost sheet in the stack from the clamping means, lifting the leading edge while holding the rear edge of the sheet against the remainder of the stack, lifting the rear edge of the sheet from the stack to remove the uppermost sheet from the stack and subsequently removing the interleaf from the stack;

a generally tray-shaped cassette for receiving the stack of media sheets and supporting the stack within the apparatus, said cassette including a forward wall disposed adjacent to the leading edge of the sheets in the stack, a rear wall and opposed side walls;

a plurality of air nozzles defined by the forward wall of the cassette for directing a flow of compressed air onto the interleaf as the leading edge of the uppermost sheet is lifted;

a source of compressed air for controllably delivering a flow of compressed air to the nozzles;

a manifold supported on the forward wall of the cassette for fluidly connecting the nozzles to the source of compressed air; and a plurality of tabs for clamping the leading edge of the uppermost sheet in the stack;

a plurality of compound springs, each one of the springs supporting a respective one of the plurality of clamps;

a plurality of slides, each one of the slides movingly engageable with an associated one of the plurality of compound springs; each one of the springs and its associated slide cooperating when the slide is moved to selectively move the tab supported by the spring into and out of engagement with the leading edge of the uppermost sheet in the stack; and means for simultaneously moving the plurality of slides with respect to the plurality of associated compound springs to simultaneously move the plurality of tabs into and out of clamping engagement with the leading edge of the uppermost sheet in the stack.

15. An photoplotting apparatus for exposing photosensitive plates comprising:

an imaging device for exposing photosensitive media sheets a sheet-handling apparatus for sequentially removing an uppermost media sheet from a stack of said sheets and feeding the removed sheet to the imaging device, each of said sheets having a leading edge and a back edge and said stack including interleaves disposed between adjacent sheets in the stack, said apparatus including:

clamping means for engaging the leading edge of the uppermost sheet in the stack and an interleaf disposed between the uppermost sheet and the next adjacent sheet to hold the leading edge downwardly against the stack and to assist in separating the interleaf from the uppermost sheet and hold the interleaf firmly against the stack as the uppermost sheet is removed from the stack;

articulated gripping means for disengaging the leading edge of the uppermost sheet in the stack from the clamping means, lifting the leading edge while holding the rear edge of the uppermost sheet against the remainder of the stack, and subsequently lifting the rear edge of the sheet from the stack to remove the uppermost sheet from the stack;

means for directing a controlled flow of compressed air onto the interleaf disposed between the uppermost sheet in the stack and the next adjacent sheet in the stack as the leading edge of the uppermost sheet is lifted by the gripping means; and means for removing the interleaf from the stack after the uppermost sheet has been removed by the gripping means.

16. The apparatus of claim 15, wherein the imaging device is:

an internal drum plotter including:

a partially cylindrical drum having an interior surface defining an exposure chamber within the interior of the drum, and opposed, spaced apart and generally parallel edge portions defining an opening into the exposure chamber;

a radiation source supported within the exposure chamber for generating and controllably directing radiation onto a photosensitive sheet supported within the chamber to expose the sheet;

means for substantially eliminating atmospheric turbulence generated in the chamber by the radiation source during exposure of the sheet;

means for preventing heat generated outside of the chamber from entering the chamber through the opening drum.

17. An internal drum plotter for exposing photosensitive plates comprising:

a partially cylindrical drum having an interior surface defining an exposure chamber within the interior of the drum and having opposed, spaced apart and generally parallel edge portions defining an opening into the exposure chamber;

a radiation source for generating and controllably directing radiation onto photosensitive media supported within the chamber to expose the media;

means for establishing a substantially uniform fluid flow along at least a portion of the interior surface of the drum, said means defining a plurality of apertures disposed within the chamber and arranged in fluid communication with a source of one of compressed air and an inert gas, said apertures directing one of the compressed air and the inert gas onto the interior surface of the drum to substantially eliminate atmospheric turbulence generated in the chamber during exposure of the media and to prevent heat generated outside of the chamber from entering the chamber through the opening.

* * * * *